(12) United States Patent
Zhu et al.

(10) Patent No.: US 10,683,012 B2
(45) Date of Patent: *Jun. 16, 2020

(54) SYSTEM DELAY ESTIMATION METHOD FOR AUTONOMOUS VEHICLE CONTROL

(71) Applicant: Baidu USA LLC, Sunnyvale, CA (US)

(72) Inventors: Fan Zhu, Sunnyvale, CA (US); Qi Kong, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/257,029

(22) Filed: Jan. 24, 2019

(65) Prior Publication Data

US 2019/0168769 A1 Jun. 6, 2019

Related U.S. Application Data

(63) Continuation of application No. 15/278,439, filed on Sep. 28, 2016, now Pat. No. 10,227,075.

(51) Int. Cl.
*B60W 50/06* (2006.01)
*B60W 30/16* (2020.01)
(Continued)

(52) U.S. Cl.
CPC ............ *B60W 50/06* (2013.01); *B60W 30/10* (2013.01); *B60W 30/16* (2013.01); *G05D 1/0212* (2013.01); *B60W 2050/0002* (2013.01); *B60W 2050/0022* (2013.01); *B60W 2050/0075* (2013.01); *G05D 2201/0213* (2013.01)

(58) Field of Classification Search
CPC ...... B60W 50/06; B60W 30/10; B60W 30/16; B60W 2050/0022; B60W 2050/0075; B60W 2050/0002; B60W 2550/40; B60W 2050/002; B60W 30/143; B60W 10/20; G05D 1/0212; G05D 2201/0213; G05D 1/0223

See application file for complete search history.

(56) References Cited

U.S. PATENT DOCUMENTS 4,270,810 A * 6/1981 Ruhnau .................... B60T 8/173
 303/159
5,369,584 A * 11/1994 Kajiwara ........... B60G 17/0195
 701/48

(Continued)

*Primary Examiner* — Frederick M Brushaber
(74) *Attorney, Agent, or Firm* — Womble Bond Dickinson (US) LLP

(57) ABSTRACT

In one embodiment, a steering control delay is measured, where the steering delay represents the delay between the time of issuing a steering control command and the time of a response from one or more wheels of an autonomous vehicle. A speed control delay is measured between the time of issuing a speed control command and the time of a response from one or more wheels of the autonomous vehicle or the time of supplying pressure to the gas pedal or brake pedal. In response to a given route subsequently, an overall system delay is determined based on the steering control delay and the speed control delay using a predetermined algorithm. Planning and control data is generated in view of the system delay for operating the autonomous vehicle.

24 Claims, 11 Drawing Sheets

(51) Int. Cl.
  *B60W 30/10* (2006.01)
  *G05D 1/02* (2020.01)
  *B60W 50/00* (2006.01)
  *B60W 10/20* (2006.01)
  *B60W 30/14* (2006.01)

(56) References Cited

U.S. PATENT DOCUMENTS

| | | | | |
|---|---|---|---|---|
| 5,414,625 | A * | 5/1995 | Hattori | G05D 1/0246 180/169 |
| 5,646,845 | A * | 7/1997 | Gudat | G05D 1/024 701/41 |
| 8,352,111 | B2 * | 1/2013 | Mudalige | G08G 1/22 340/435 |
| 8,352,112 | B2 * | 1/2013 | Mudalige | G08G 1/22 340/435 |
| 9,910,443 | B1 * | 3/2018 | Lee | G08G 1/166 |
| 2005/0164673 | A1 * | 7/2005 | Ehlers | G08G 1/096811 455/404.1 |
| 2007/0138347 | A1 * | 6/2007 | Ehlers | G01C 21/3476 246/1 R |
| 2010/0256835 | A1 * | 10/2010 | Mudalige | G08G 1/163 701/2 |
| 2010/0256836 | A1 * | 10/2010 | Mudalige | G08G 1/163 701/2 |
| 2012/0232781 | A1 * | 9/2012 | Sugawara | G01C 21/3655 701/400 |
| 2013/0016735 | A1 * | 1/2013 | De Campos Cartolomeu | H04L 12/413 370/458 |
| 2013/0253793 | A1 * | 9/2013 | Lee | B60W 50/029 701/70 |
| 2014/0303827 | A1 | 10/2014 | Dolgov et al. | |
| 2015/0158524 | A1 * | 6/2015 | Lee | B62D 15/025 701/41 |
| 2015/0251664 | A1 * | 9/2015 | Zagorski | B60T 7/22 701/41 |
| 2015/0321666 | A1 * | 11/2015 | Talty | B60D 1/62 701/41 |
| 2017/0203770 | A1 * | 7/2017 | Kondo | B60W 50/14 |
| 2017/0327112 | A1 * | 11/2017 | Yokoyama | G05D 1/0223 |
| 2018/0086351 | A1 * | 3/2018 | Zhu | B60W 30/10 |
| 2018/0088576 | A1 * | 3/2018 | Kong | G05D 1/0212 |
| 2018/0111621 | A1 * | 4/2018 | Buss | B62D 13/005 |

* cited by examiner

| Driving Scenarios | Steering Control Delay | Speed Control Delay | Computational Delay | Communication Delay | Other Delays |
|---|---|---|---|---|---|
| Accelerate 5 mph in 100 meters | | | | | |
| Maintain speed and drive 100 meters | | | | | |
| Decelerate 10 mph in 100 meters | | | | | |
| Merge to the right lane in 100 meters at 40 mph | | | | | |
| Drive on tarmacked road and cement road | | | | | |
| Board machine working under 30 to 70 degrees C | | | | | |
| x x x | | | | | |

FIG. 5

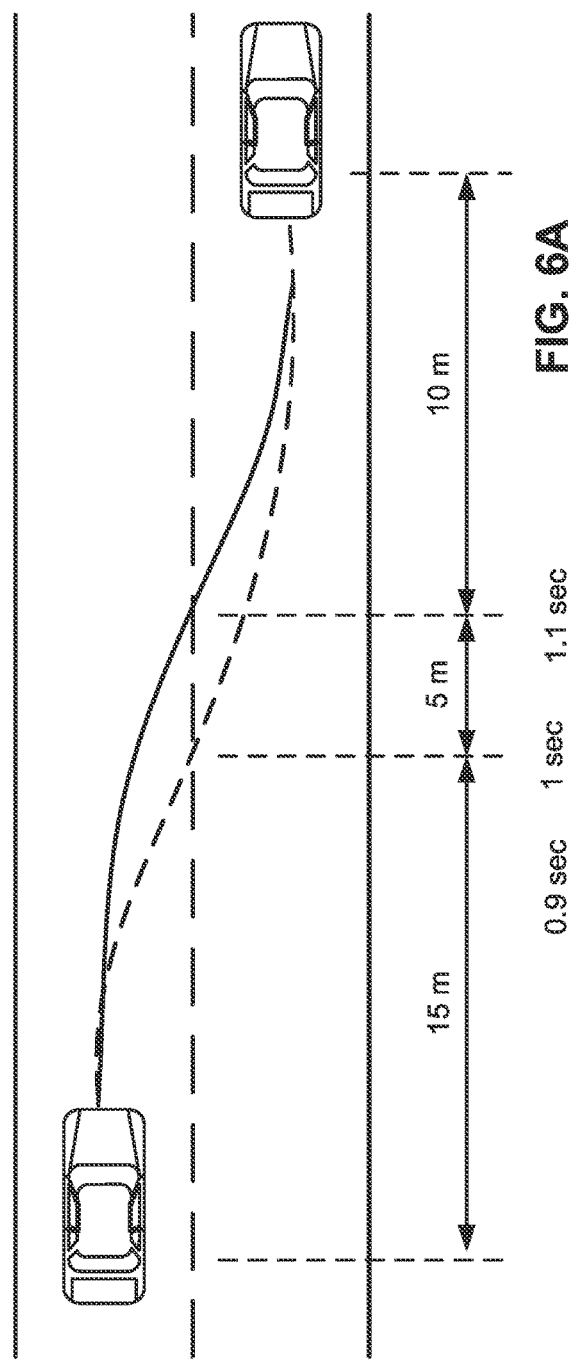 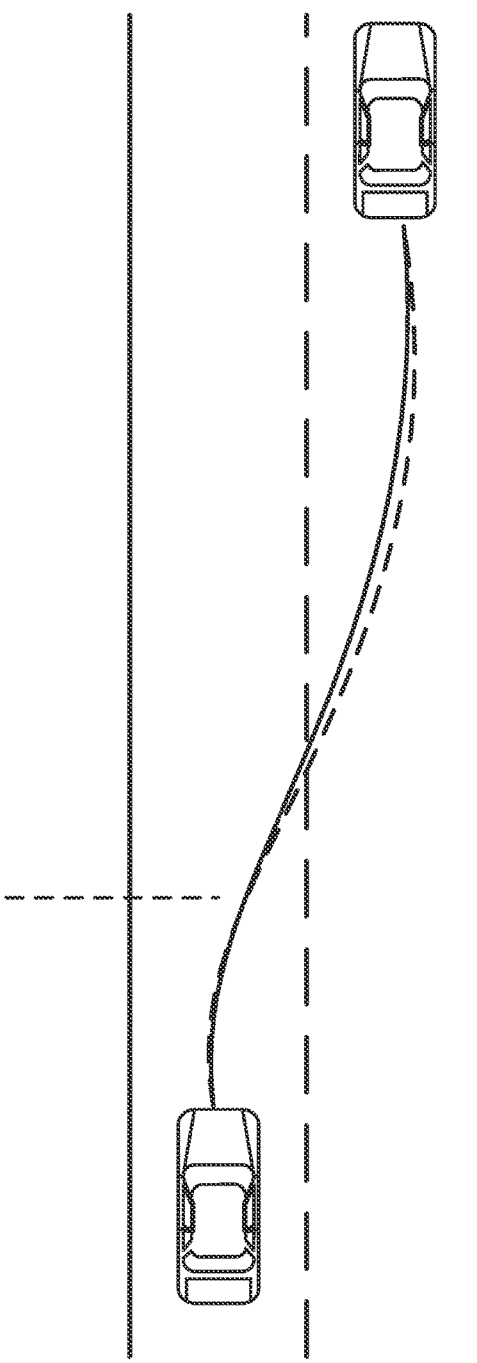

SYSTEM DELAY ESTIMATION METHOD FOR AUTONOMOUS VEHICLE CONTROL

RELATED APPLICATION

This application is a continuation application of U.S. patent application Ser. No. 15/278,439, filed Sep. 28, 2016, which is incorporated by reference in its entirety.

TECHNICAL FIELD

Embodiments of the present invention relate generally to operating autonomous vehicles. More particularly, embodiments of the invention relate to estimating system delays for autonomous vehicles in operating the autonomous vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, due to certain configuration or designs of the system, there may be certain system delays between issuing control commands and responses form the vehicle. Such system delays may cause problems such as accuracy on planning and controlling the vehicle under certain circumstances. It is difficult to determine or estimate such system delays.

BRIEF DESCRIPTION OF THE DRAWINGS

Embodiments of the invention are illustrated by way of example and not limitation in the figures of the accompanying drawings in which like references indicate similar elements.

FIG. 5 is a block diagram illustrating an example of a driving scenario to system delay mapping table according one embodiment of the invention.

FIGS. 6A and 6B are diagrams illustrating operating an autonomous vehicle with and without system delays according to one embodiment of the invention.

DETAILED DESCRIPTION

Figure 1:
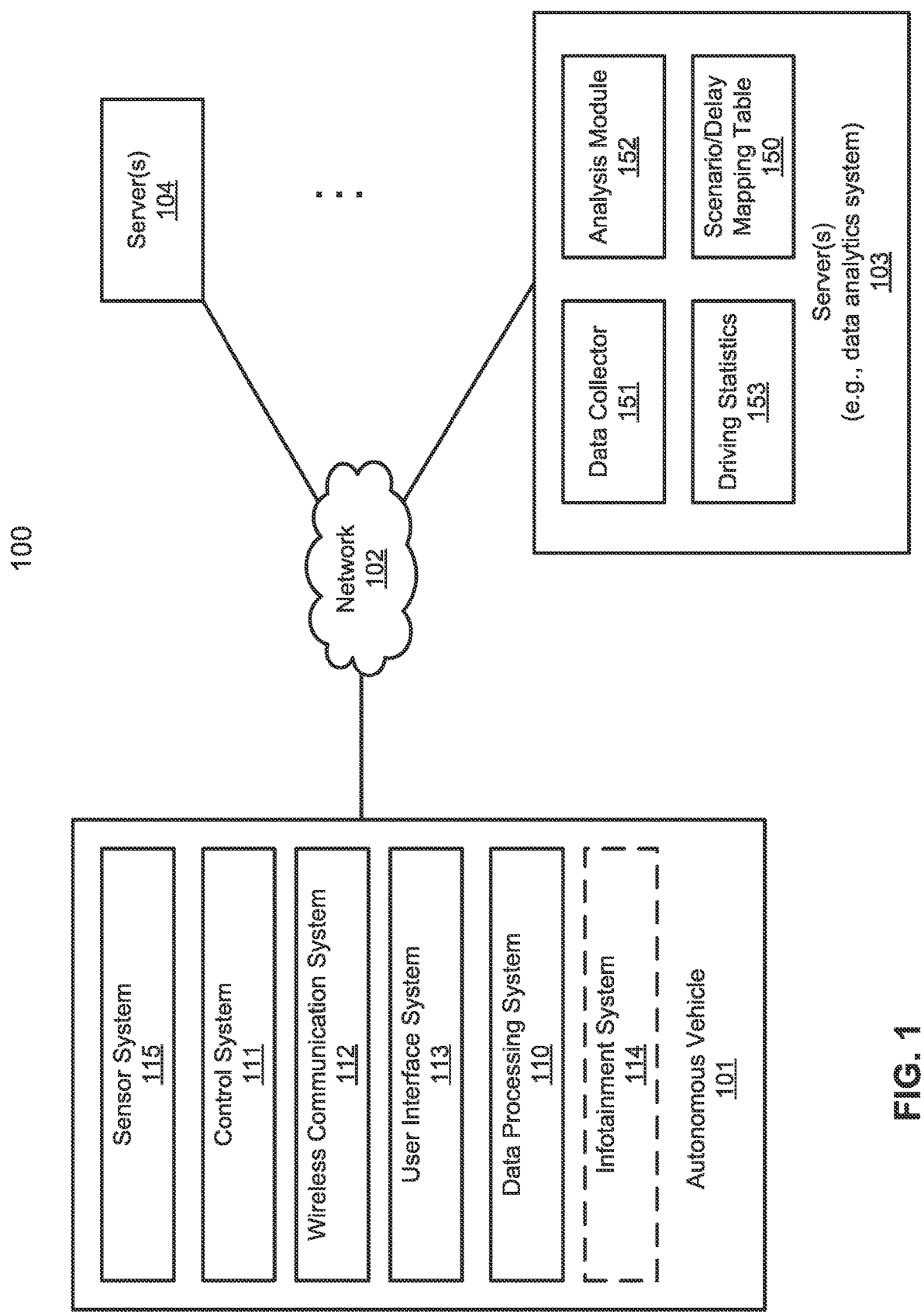
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to one aspect of the invention, a delay estimation mechanism is utilized to estimate different kinds of delays occurred in an autonomous vehicle in different driving situations. The delay estimation mechanism is further to leverage these delays to infer a best vehicle position that best reflects a delay corrected position. In one embodiment, the system delay may be determined based on various different delays including, but are not limited to, a steering control delay, a speed control delay, a computational delay, and a communication delay within the autonomous vehicle. Some of these delays such as the steering control delay and the speed control delay may be measured using certain sensors. Other delays such as computational delay and communication delay may be estimated dependent upon the system architecture or configuration. The system delay is then determined based on at least some of these delays using a predetermined formula (e.g., a weighted algorithm). The system delay can be utilized subsequently to adjust the timing of issuing control commands in driving the autonomous vehicle.

In one embodiment, a steering control delay is measured, where the steering delay represents the delay between the time of issuing a steering control command and the time of a response received from one or more wheels of an autonomous vehicle. A speed control delay is measured between the time of issuing a speed control command and the time of a response received from one or more wheels of the autonomous vehicle or the time of supplying a pressure to the gas pedal or brake pedal. In response to a given route subsequently, an overall system delay is determined based on the steering control delay and the speed control delay using a predetermined algorithm. Planning and control data is generated in view of the system delay for operating the autonomous vehicle.

According to another aspect of the invention, certain driving parameters of different vehicles are recorded under different driving scenarios. A driving scenario refers to a specific driving pattern such as driving a specific distance with a specific speed (e.g., maintaining a constant speed, acceleration, or deceleration), turning with a specific turning angle at a certain speed, changing lanes at a certain speed and/or angle, etc. The pressures applied to the gas pedal and/or brake pedal can also be recorded. In addition, the system delay regarding issuing the associated control commands for each of the vehicles under each of the driving scenarios is determined or estimated, including a steering control delay, a speed control delay, a computational delay, and/or a communication delay. A database or a driving scenario to system delay (scenario/delay) mapping table is created. The scenario/delay mapping table includes a number of mapping entries. Each mapping entry maps a particular driving scenario to a system delay. The scenario/delay mapping table is utilized subsequently during real-time driving to compensate the system delay when planning and control an autonomous vehicle in the same or a similar driving scenario or environment.

In one embodiment, a driving scenario is determined for a next route segment or route for an autonomous vehicle. In response, a lookup operation is performed in a scenario/delay mapping table to locate a mapping entry that matches the determined driving scenario. The scenario/delay mapping table includes a number of mapping entries. Each mapping entry maps a particular driving scenario to a system delay that has been calculated for that particular driving scenario. Thereafter, the autonomous vehicle is controlled and driven in view of the system delay corresponding to the driving scenario at the point in time, including issuing control commands according to timing compensating the system delay under the circumstances.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (POI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, data processing system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or data processing system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
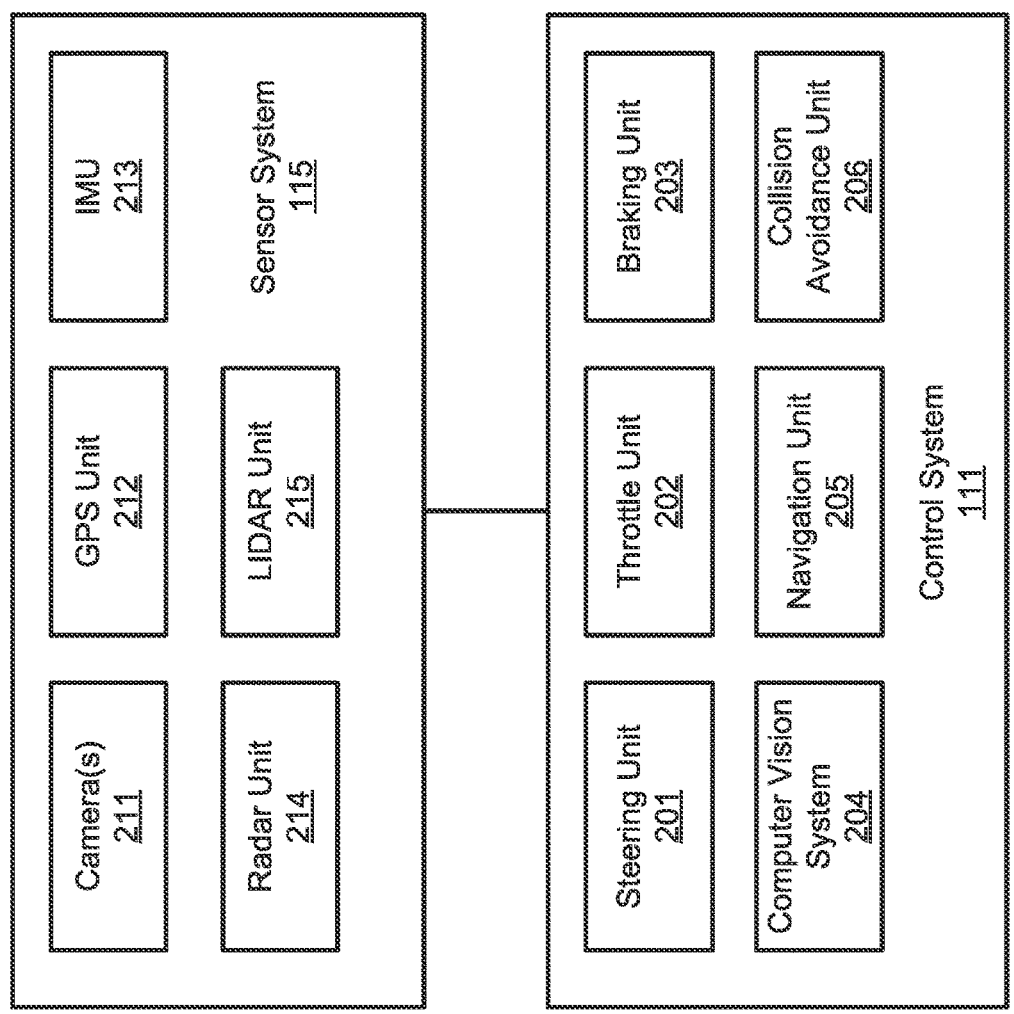
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), braking unit 203, computer vision system 204, navigation unit 205 (also referred to as a navigation and pathing or navigation/pathing system), and collision avoidance unit 206 (also referred to as an obstacle avoidance system). Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle.

Computer vision unit or system 204 is to process and analyze images captured by one or more cameras 211 in order to identify objects and/or features in the environment of autonomous vehicle. The objects can include traffic signals, road way boundaries, other vehicles, pedestrians, and/or obstacles, etc. Computer vision system 204 may use an object recognition algorithm, video tracking, and other computer vision techniques. In some embodiments, computer vision system 204 can map an environment, track objects, and estimate the speed of objects, etc.

Navigation unit or system 205 is to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via a user interface. Navigation system 205 may update the driving path dynamically while the autonomous vehicle is in operation. Navigation system 205 can incorporate data from a GPS system and one or more maps so as to determine the driving path for the autonomous vehicle.

Collision avoidance unit or system 206 is to identify, evaluate, and avoid or otherwise negotiate potential obstacles in the environment of the autonomous vehicle. For example, collision avoidance system 206 may effect changes in the navigation of the autonomous vehicle by operating one or more subsystems in the control system to undertake swerving maneuvers, turning maneuvers, braking maneuvers, etc. Collision avoidance system 206 may automatically determine feasible obstacle avoidance maneuvers on the basis of surrounding traffic patterns, road conditions, etc. Collision avoidance system 206 may be configured such that a swerving maneuver is not undertaken when other sensor systems detect vehicles, construction barriers, etc. in the region adjacent the autonomous vehicle that would be swerved into. Collision avoidance system 206 may automatically select the maneuver that is both available and maximizes safety of occupants of the autonomous vehicle. Collision avoidance system 206 may select an avoidance maneuver predicted to cause the least amount of acceleration in a passenger cabin of the autonomous vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some of all of the functions of autonomous vehicle 101 may be controlled or managed by data processing system 110, especially when operating in an autonomous driving mode. Data processing system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, data processing system 110 may be integrated with vehicle control system 111.

For example, a user as a passenger may specify a starting location and a destination of a trip, for example, via a user interface. Data processing system 110 communicates with other components of autonomous vehicle 101 to obtain the trip related data. For example, data processing system 110 may obtain location and route information from a location server and a map and POI (MPOI) server, which may be a part of servers 103-104. The location server provides location services and the MPOI server provides map services and the POIs of certain locations. Alternatively, such location and MPOI information may be cached locally in a persistent storage device of data processing system 110.

During traveling of autonomous vehicle 101 along the route, data processing system 110 may also obtain real-time traffic information from a traffic information system or server (TIS). Note that servers 103-104 may be operated by a third party entity. Alternatively, the functionalities of servers 103-104 may be integrated with data processing system 110. Based on the real-time traffic information, MPOI information, and location information, as well as real-time local environment data detected or sensed by sensor system 115 (e.g., obstacles, objects, nearby vehicles), data processing system 110 can plan an optimal route and drive vehicle 101, for example, via control system 111, according to the planned route to reach the specified destination safely and efficiently.

According to one embodiment, autonomous vehicle 101 may further include infotainment system 114 to provide information and entertainment to passengers of vehicle 101. The information and entertainment content may be received, compiled, and rendered based on content information stored locally and/or remotely (e.g., provided by servers 103-104). For example, the information may be streamed in real-time from any of servers 103-104 over network 102 and displayed on a display device of vehicle 101. The information may be augmented with local information captured in real-time, for example, by one or more cameras and the augmented content can then be displayed in a virtual reality manner.

In one embodiment, based on location and route information, MPOI information, and/or real-time traffic information, infotainment system 114 and/or data processing system 110 determines certain types of content that are suitable for the current traffic environment (e.g., MPOIs). The system performs a lookup operation in a content index (not shown) to identify a list content items (e.g., sponsored content or Ads) as content item candidates, for example, based on the real-time traveling information.

In one embodiment, the system ranks the content items in the list using a variety of ranking algorithm. The content items may be ranked based on a user profile of the user. For example, the content items may be ranked based on user preferences, which may be derived from the user profile. The user profile may be compiled based on a history of user operations of the user in the past. In one embodiment, the system applies one or more content ranking models to each of the content items to determine a ranking score for each content item. A content item having a ranking score that is above a predetermined threshold may be selected. The content ranking models may be trained using sets of known features representing similar traveling environments or traffic conditions in the past. The content ranking models may also be trained based on user profiles of similar users.

The selected content item is then rendered and displayed on a display device within the autonomous vehicle. In one embodiment, the system further augments the selected content item onto an image that is captured at the point in time using one or more cameras of the autonomous vehicle. In one embodiment, an image recognition is performed on the image and to derive or understanding the content represented by the image. For example, one or more keywords may be derived to describe the image or a POI. The list of content items may be identified further based on the one or more keywords or the POI represented by the image. The system then augments the selected content item onto the image generate an augmented image, where the content item may be superimposed on the image. The augmented image is then displayed on a display device of the autonomous vehicle. Note that infotainment system 114 may be integrated with data processing system 110 according to some embodiments.

Alternatively, a user can specifically select from a list of precompiled content (e.g., videos, movies) from a content store or database, which may be periodically updated from a content server of a content provider over a network (e.g., cloud network). Thus, a user can specifically select the real-time actual content captured in real-time or previously rendered content to be displayed on the display device(s), for example, retrieved from data store 125. For example, if autonomous vehicle 101 is traveling in a snowy day in New York City, the user can switch the display devices to display a sunny environment in Hawaii as if autonomous vehicle 101 was traveling on a sunny day. The content may be displayed in multiple display devices (e.g., multiple windows) in a collaborated or coordinated manner, i.e., virtual reality manner.

Referring back to FIG. 1, according to one embodiment, in planning a next route or next route segment, data processing system 110 takes the system delay into consideration. Specifically, when planning the next move, the system determines a driving scenario at the point in time and obtains the system delay corresponding to the driving scenario. The system generates planning and control data based on the associated system delay, for example, by issuing control commands an appropriate timing, magnitude, and/or turning angles in view of the system delay. The system delay may be determined online during driving of the autonomous vehicle. Alternatively, the system delay may be determined offline based on a large amount of driving statistics of a large number of vehicles under various driving situations or conditions.

According to one embodiment, the system delay may be determined by an analytics system such as server 103 based on a large amount of driving statistics of a large number of different vehicles. The system delay is then loaded onto autonomous vehicle 101 in a data structure such as a database or table to be utilized during real-time or online driving. In one embodiment, data analytics system 103 operating as a server includes, but is not limited to, data collector 151 and data analysis module 152. Data collector 151 collects various driving statistics 153 that were recorded and captured from a variety of vehicles under different driving scenarios and/or conditions. In addition, driving statistics 153 further include certain system delays that were measured and/or estimated by various sensors of the vehicles during the driving operations.

In one embodiment, a system delay may be determined based on various different delays including, but are not limited to, a steering control delay, a speed control delay, a computational delay, and a communication delay within the autonomous vehicle. Some of these delays such as steering control delay and speed control delay may be measured using certain sensors (e.g., steering sensors, wheel sensors, throttle sensors, or brake sensors, etc.). Other delays such as computational delay and communication delay may be estimated. The system delay is then determined based on these delays using a predetermined formula (e.g., a weighted algorithm).

Based on driving statistics 153, analysis module 152 performs an analysis to determine the system delays corresponding to different driving scenarios or situations. Analysis module 152 creates scenario/delay mapping table 150 to store the system delays corresponding to different driving scenarios. In one embodiment, scenario/delay mapping table 150 includes a number of mapping entries. Each mapping entry maps a particular driving scenario to a system delay. A system delay may be calculated based on various types of delays such as a steering control delay, a speed control delay, a computational delay, and a communication delay. Alternatively, each mapping entry maps a particular driving scenario to a set of individual steering control delay, speed control delay, computational delay, and communication delay.

Scenario/delay mapping table 150 may then be uploaded into an autonomous vehicle, where scenario/delay mapping table 150 can be utilized to compensate the system delay in determining the timing of issuing control commands to control and drive the autonomous vehicle. Alternatively, the system delay such as the steering control delay, speed control delay, computational delay, and communication delay can be measured or estimated at real-time during operating the autonomous vehicle. They can be utilized to compensate issuing the control commands without being subjected to a specific driving scenario at the point in time. Note that scenario/delay mapping table 150 may be implemented in a variety of data structures such as databases or other lookup tables.

Figure 3:
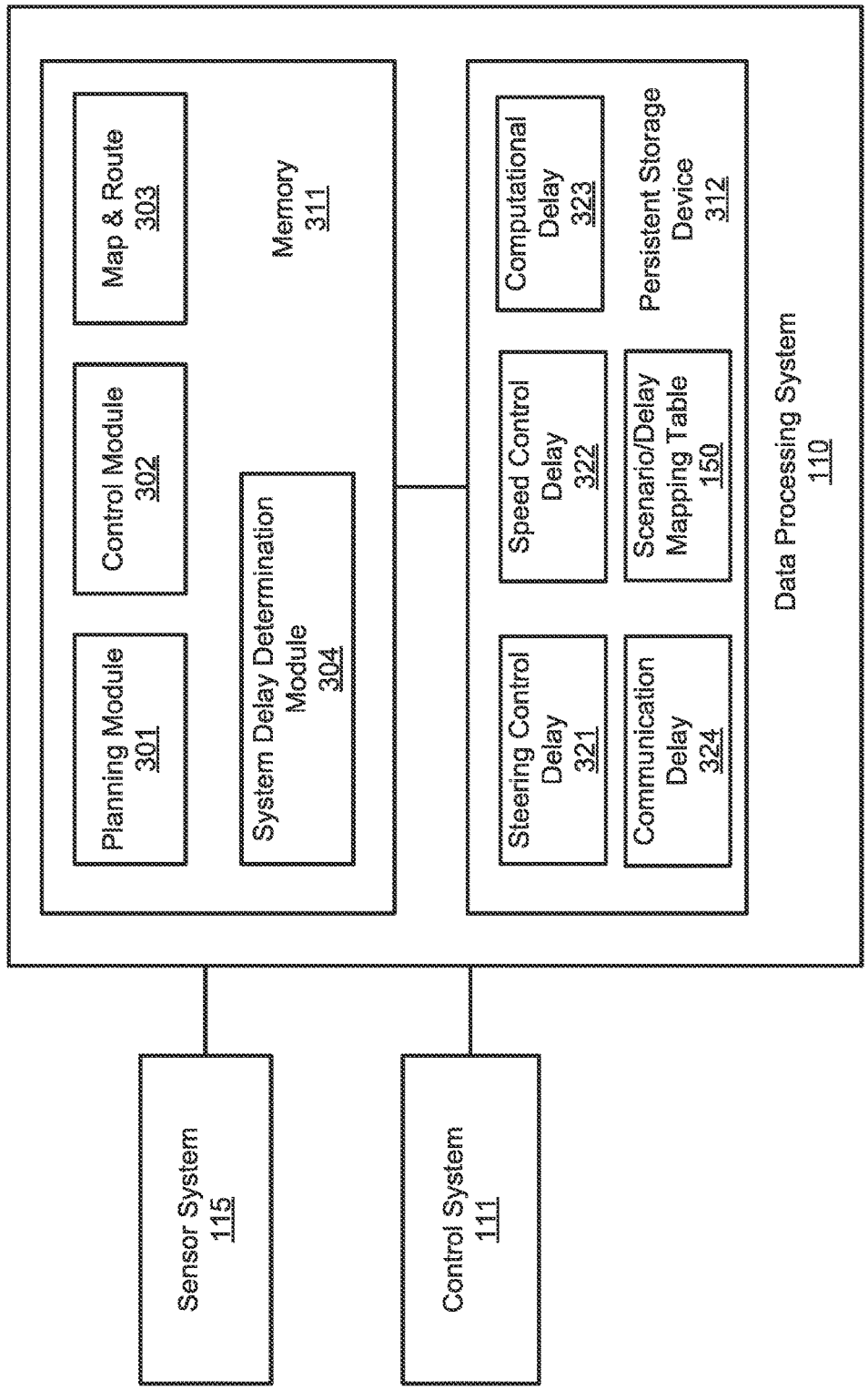
FIG. 3 is a block diagram illustrating an example of a data processing system used with an autonomous vehicle according to one embodiment of the invention.

FIG. 3 is a block diagram illustrating an example of a data processing system used with an autonomous vehicle according to one embodiment of the invention. System 300 may be implemented as a part of autonomous vehicle 101 of FIG. 1. Referring to FIG. 3, data processing system 110 includes, but is not limited to, planning module 301, control module 302, map and route module 303, and system delay determination module or calculator 304. Any of modules 301-304 may be implemented in software, hardware, or a combination thereof. For example, any of modules 301-304 may be installed in persistent storage device 312 (e.g., hard disks), loaded into memory 311, and executed by one or more processors (not shown).

Planning module 301 is to plan a path or route for the autonomous vehicle based on a variety of information, such as, sensor data received from sensor system 115 and/or real-time information received from a variety of sources (e.g., location, map, POI as part of map and point of interest or MPOI database provided by map and route module 303). The planning and control data is generated by planning module 301. Based on the planning and control data control module 302 is to control the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route. Note that planning module 301 and control module 302 may be communicatively coupled to or integrated with navigation unit 205 of vehicle control system 111 of FIG. 2.

According to one embodiment, system delay determination module 304 (simply referred to as a delay calculator) determines an overall system delay for autonomous vehicle 300. In one embodiment, such a system delay may be calculated or determined based on at least one of steering control delay 321, speed control delay 322, computational delay 323, communication delay 324, or other delays (referred to as individual delays) under certain circumstances. Such delays 321-324 may be measured or estimated based on a large amount of driving records by a large number of vehicles in a large number of different driving scenarios or driving conditions. Such delays 321-324 may be determined by a data analytics system, such as data analytics system 103 offline, by collecting and analyzing a huge amount of driving statistics. For example, a particular type of delays may be determined based on an average delay of the same type incurred in a large number of vehicles of the same or similar types.

Alternatively, delays 321-324 may be determined or measured at real-time by delay determination module 304. However, such an approach may have a lower performance or take longer time to compute during online driving. In contrast, by calculating delays 321-324 offline by a dedicated data analytics system, delays 321-324 are ready to use online that will reduce the time to determine delays 321-324. In one embodiment, delays 321-324 may be periodically updated by online measurement within autonomous vehicle 300 and/or offline delay calculation from a variety of vehicles by a data analytics system.

In one embodiment, system delay determination module 304 includes a steering control delay determination module (not shown) to determine steering control delay 321. Steering control delay 321 may be measured between the time of issuing a steering control command and the time of a response received from one or more wheels of vehicle 300. Steering control delay 321 may be measured based on the time between issuing a steering control command and the wheels of the vehicle have been positioned in an angle specified by the steering control command, which may be sensed by one or more steering sensors.

System delay determination module 304 may further include a speed control delay determination module (not shown) to determine speed control delay 322, which includes a delay in acceleration, deceleration, or maintaining the same speed. Speed control delay 322 may be measured between the time of issuing a speed control command (e.g., acceleration, deceleration or braking) and the time a response received from the wheels of the vehicle indicating that the vehicle starts changing of the speed. Speed control delay 322 may include an acceleration delay representing a difference between the time of issuing an acceleration or throttle command and the time that vehicle starts accelerating. Speed control delay 322 may include a deceleration delay representing a difference between the time of issuing a deceleration or braking command and the time the vehicle starts decelerating.

Computational delay 323 refers to the computational time the system (e.g., planning module 301, control module 302, control system 111, and the communication bus such as a CAN bus) takes to generate and issue control commands. Computational delay may further include sleep time. For example, if the computation is performed on a 10 hertz (Hz) frequency (e.g. computing driving parameters every 0.1 second), the average sleep time would be 50 milliseconds (ms). Such a sleep time would be considered as part of a computational delay because during the sleep time the system is unlikely to process any commands or responses.

Communication delay 324 refers the delay or communication cost between the control system, the communication bus, and a response from the vehicle. Computational delay 323 and communication delay 324 may be estimated based on the prior operations of the vehicle or vehicles of the same or similar type.

In one embodiment, system delay determination module 304 calculates the overall or final system delay based on one or more of steering control delay 321, speed control delay 322, computational delay 323, or communication delay 324, using a predetermined delay algorithm. In one embodiment, the predetermined algorithm is a weighted algorithm, where each of steering control delay 321, speed control delay 322, computational delay 323, or communication delay 324 that is involved in the calculation is assigned with a weight factor or coefficient. Dependent upon the specific driving scenario or circumstances, a weight factor or coefficient may be different for each of the individual delays involved in the calculation. For example, if the vehicle is about to turn, a weight coefficient corresponding to steering control delay 321 may be adjusted higher. If the vehicle is moving straight, the weight coefficient corresponding to speed control delay 322 may be adjusted higher, especially, when a difference between the current speed and the target speed of the vehicle is larger (e.g., larger than a predetermined threshold). The adjustment may be applied at real-time dependent upon the specific situation. The calculated system delay can be used to compensate the timing of issuing control commands and delayed responses from the vehicle.

Figure 4:
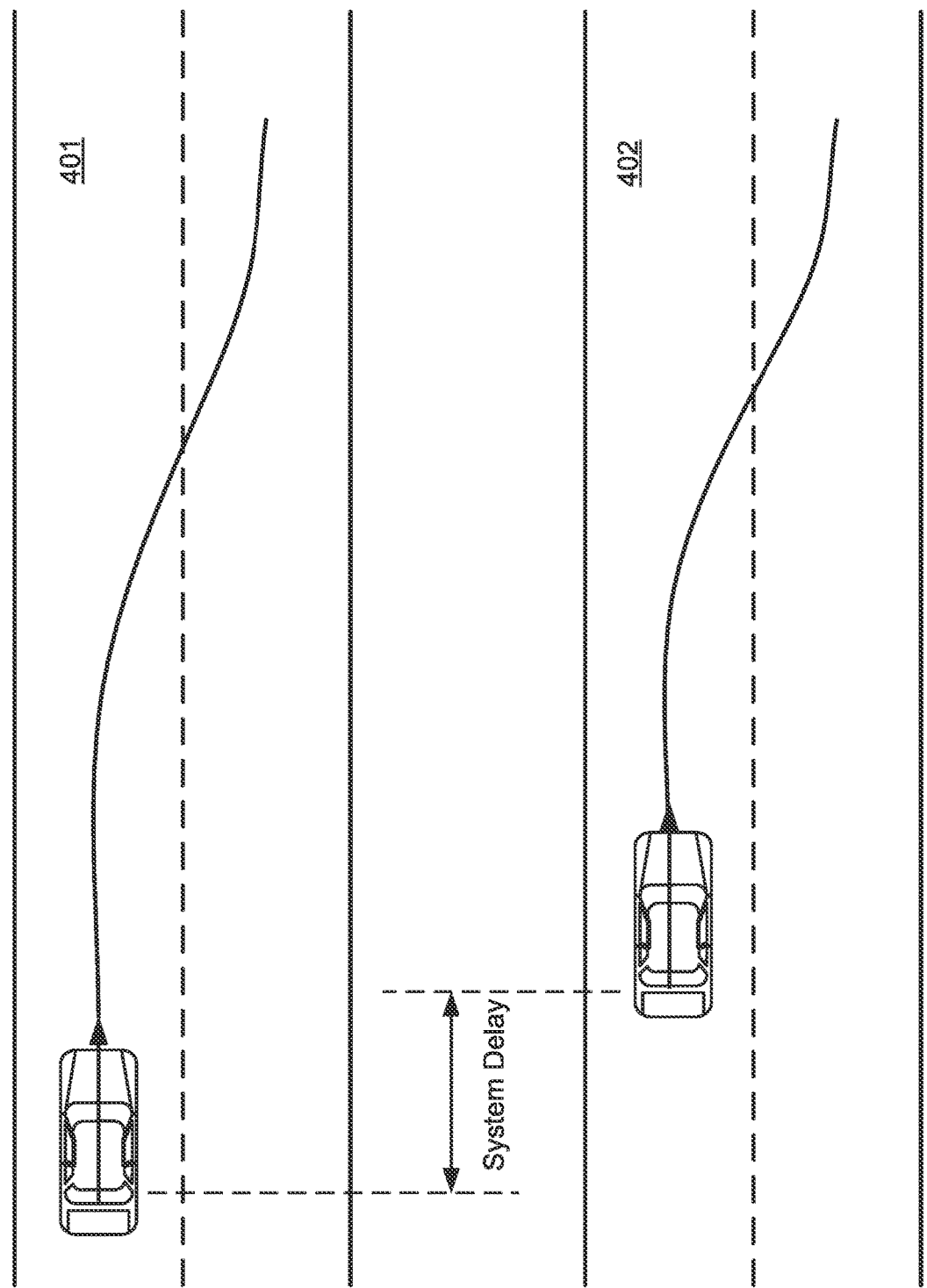
FIG. 4 is a diagram illustrating operating an autonomous vehicle with and without system delays.

For example, referring now to FIG. 4, it is assumed that the vehicle is at position 401. Given the system delay, when a control command is issued, the vehicle may receive and respond to the control command at position 402. Such a delay may cause errors in determining the driving parameters (e.g., throttle, brake parameters), which may cause uncomfortable to the passengers. When the vehicle receives a control command, the vehicle may not be at original position 401 of which the control command was determined. Rather, the vehicle may be at position 402. As a result, when the vehicle executes the received control command, it may be too late, and the control system may have to correct such situation by issuing another command. By calculating and knowing the system delay, the timing and the driving parameters associated with a control command can be adjusted and planned in view of the system delay to compensate the system delay. For example, in this example, a control command can be issued earlier in view of the system delay.

Referring back to FIG. 3, in one embodiment, data processing system 110 may further maintain scenario/delay mapping table 150, which may be created offline by a data analytics system such as system 103 of FIG. 1. As described above, the time delays of steering, throttle and brake in different driving situations are measured and recorded based on large driving data. For example, different driving situations could include but not limited to: accelerating 5 mile per hour (mph) in 100 meters, maintaining speed and drive 100 meters, decelerating 10 mph in 100 meters, merging to the right lane in 100 meters at 40 mph, driving on tarmacked road and cement road, on board machine working under 30° C. or 70° C. temperature, controlling algorithm running on a high performance computer or a low perform computer etc. Autonomous driving commands, such as pressure to throttle, pressure to brake, wheel angle, gear, may be recorded. Status, including current speed, wheel angle, etc., may also be record Scenario/delay mapping table 150 includes a number of mapping entries. Each mapping entry maps a particular driving scenario to a system delay. An example of a scenario/delay mapping table is shown in FIG. 5 according to one embodiment. A driving scenario refers to a specific driving pattern such as driving a specific distance with a specific speed, turning with a specific turning angle at a certain speed. The pressures applied to the gas pedal and/or brake pedal can also be recorded. In addition, the system delay regarding issuing the associated control commands for each of the vehicles under each of the driving scenario is determined or estimated, including a steering control delay, a speed control delay, a computational delay, and a communication delay. The scenario/delay mapping table 150 is utilized subsequently in real-time driving to compensate the system delay when planning and control an autonomous vehicle in a similar driving scenario or environment.

In one embodiment, when planning a next route or route segment, planning module 301 determines a driving scenario corresponding to the next route segment or route for an autonomous vehicle. A lookup operation is performed in scenario/delay mapping table 150 to locate a mapping entry that matches the determined driving scenario. Thereafter, planning module 301 and/or control module 302 controls the autonomous vehicle in view of the system delay corresponding to the driving scenario at the point in time, including issuing control commands according to timing compensating the system delay under the circumstances.

Thus, during online driving, the system first checks the situation or driving scenario and determines the time delay of system based on the offline data and the real time recording, for example, by searching in scenario/delay mapping table. Then the system will use the time delay to calculate the steering, throttle and brake in the future instead of real time calculated one. For example, referring now to FIGS. 6A and 6B, it is assumed current driving plan is to change lane to the right lane in 30 meters as indicated in a dash line. If a steering degree command (5 degrees in this example) is issued without delay compensation, the vehicle would have responded in a delay of 0.1 second and the actual path will be off from the expected or planned path as indicated in a solid line as shown in FIG. 6A. By considering the system delay as determined using the techniques described above, the command should be sent in 0.9 second but not exactly 1 second as there is 0.1 second time delay for taking the physical action (e.g. based on the matching driving scenario from the scenario/delay mapping table). As a result, the vehicle can respond as expected that the actual path and the planned path substantially match as shown in FIG. 6B.

Figure 7B:
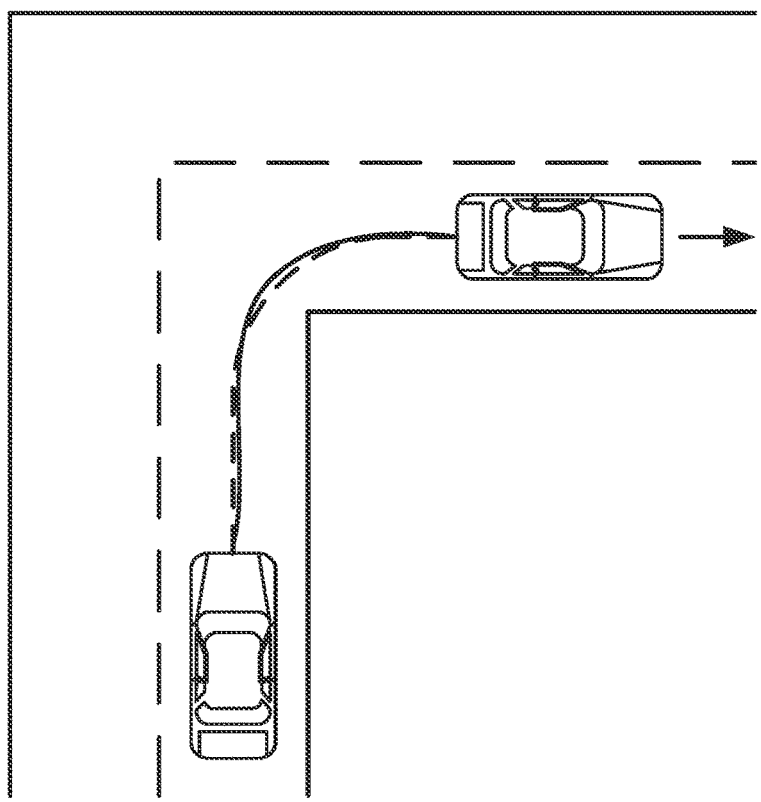
FIGS. 7A and 7B are diagrams illustrating operating an autonomous vehicle with and without system delays according to another embodiment of the invention.
Figure 7A:
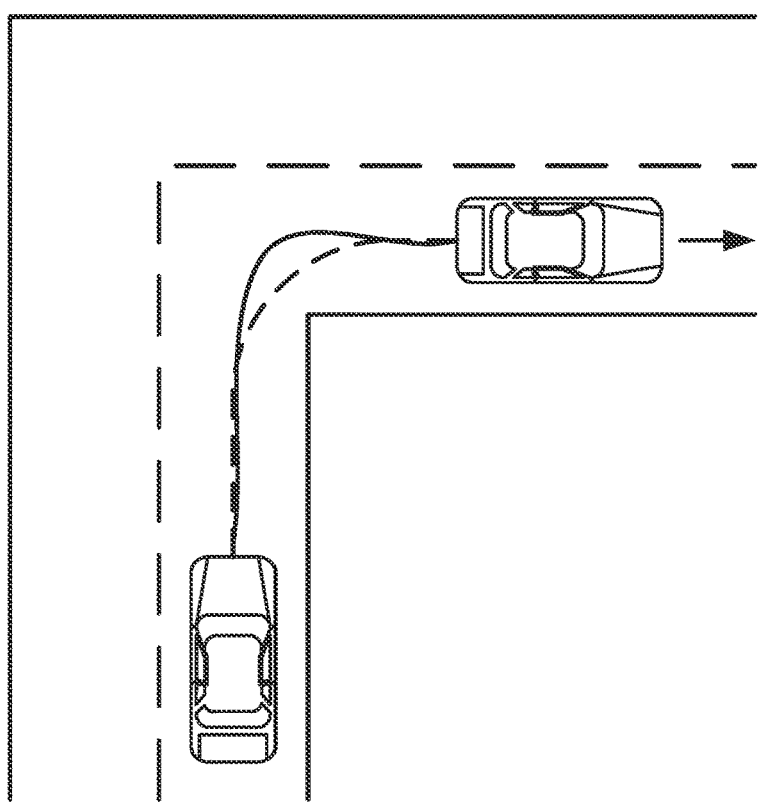

Similarly, referring now to FIGS. 7A and 7B, when a vehicle turns, a system delay may cause the vehicle to react in a delayed fashion as indicated in a solid line as shown in FIG. 7A. In some situation, by the time the vehicle detects that the vehicle is not following the planned path, it may over react as shown in the solid line that may cause uncomfortable to the passengers. By considering the system delay when planning the route, the commands may be issued earlier and/or different turning angle, as well as other driving parameters (e.g., speed, turning angle), the vehicle can closely follow the planned path as shown in FIG. 7B.

Figure 8:
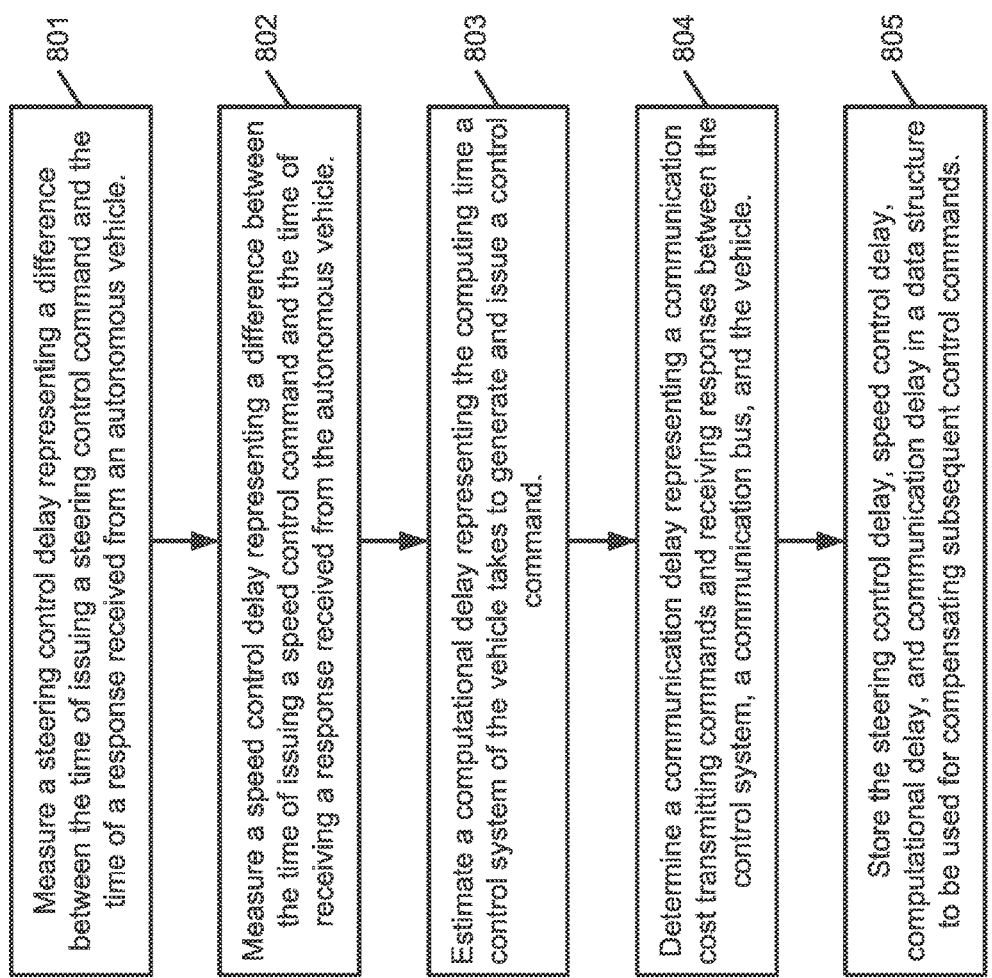
FIG. 8 is a flow diagram illustrating a process of estimating a system delay of an autonomous vehicle according to one embodiment of the invention.

FIG. 8 is a flow diagram illustrating a process of estimating a system delay of an autonomous vehicle according to one embodiment of the invention. Process 800 may be performed by processing logic which may include software, hardware, or a combination thereof. For example, process 800 may be performed by system delay determination module 304 of FIG. 3. Alternatively, process 800 may be performed by data analytics system 103 based on the driving statistics collected from various vehicles. Referring to FIG. 8, at block 801, processing logic measures a steering control delay of a vehicle. The steering control delay represents a difference between the time of issuing a steering control command and the time of a response received from a steering sensor of the vehicle. At block 802, processing logic measures a speed control delay of the vehicle. The speed control delay represents a time difference between the time of issuing a speed control command (e.g., acceleration, deceleration/braking, maintaining constant speed) and the time of a response form the vehicle (e.g., time of starting acceleration, deceleration).

At block 803, processing logic estimates a computational delay of the vehicle. The computational delay represents the time the control system of the vehicle takes to generate and issue a control command. At block 804, processing logic estimates a communication delay of the vehicle. The communication delay represents the delay between the control system, the communication bus (e.g., CAN bus), and responses from the vehicle. The steering control delay, speed control delay, computational delay, and/or communication delay are then stored in a data structure, which can be used to adjust the subsequent control commands and compensate the timing of issuing such commands.

Figure 9:
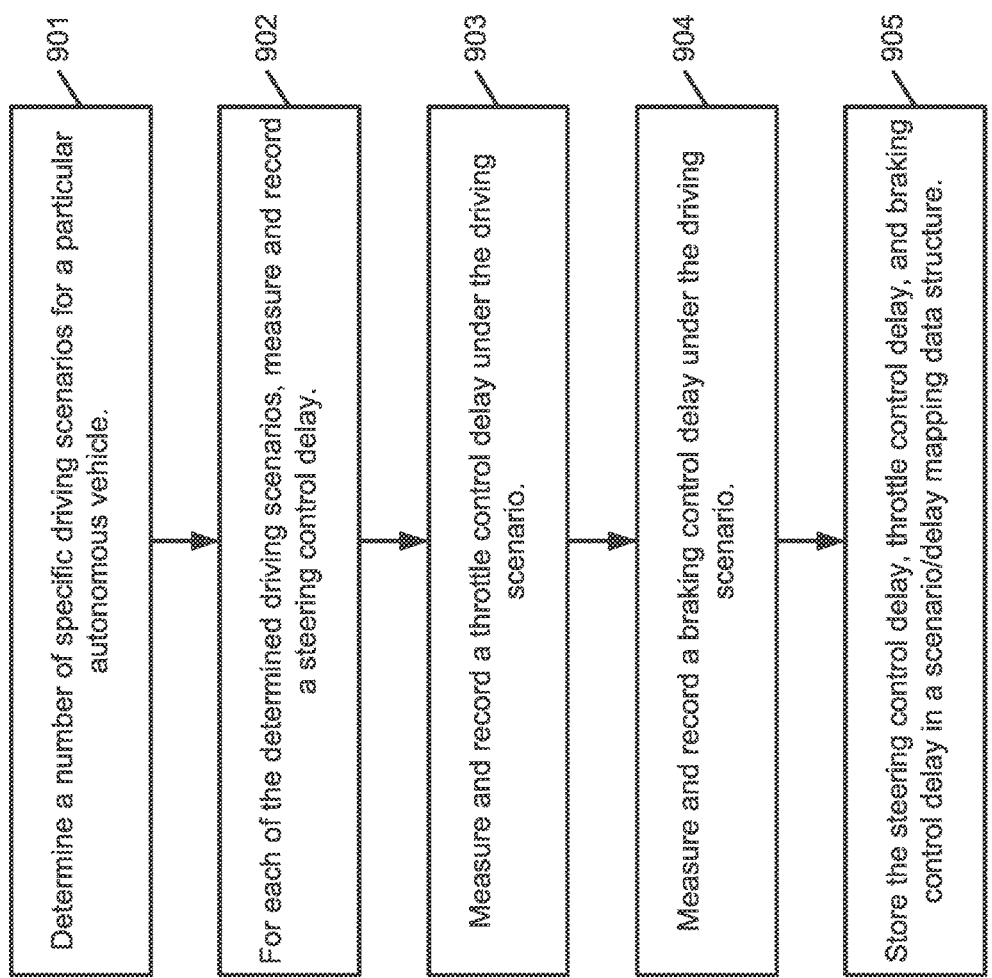
FIG. 9 is a flow diagram illustrating a process of estimating a system delay of an autonomous vehicle according to another embodiment of the invention.

FIG. 9 is a flow diagram illustrating a process of determining a system delay of an autonomous vehicle according to another embodiment of the invention. Process 900 may be performed by processing logic which may include software, hardware, or a combination thereof. For example, process 900 may be performed by system delay determination module 304 of FIG. 3. Alternatively, process 900 may be performed by data analytics system 103 based on the driving statistics collected from various vehicles. Referring to FIG. 9, at block 901, processing logic determines a number of driving scenarios for a particular type of autonomous vehicles. For each of the driving scenarios, at block 902, processing logic measures and records a steering control delay while the vehicle is driving under the same or similar driving scenario or driving condition.

At block 903, processing logic measures and records a throttle control delay (e.g., acceleration delay) while the vehicle is driving under the same or similar driving scenario or driving condition. At block 904, processing logic measures and records a braking control delay (e.g., deceleration delay) while the vehicle is driving under the same or similar driving scenario or driving condition. At block 905, the steering control delay, throttle control delay, and braking control delay are stored in a scenario/delay mapping data structure for the particular type of autonomous vehicles. The above operations may be iteratively performed for a large number of vehicles of the same type or similar types. The delays may then be calculated based on the averaged delays of a variety of vehicles.

Figure 10:
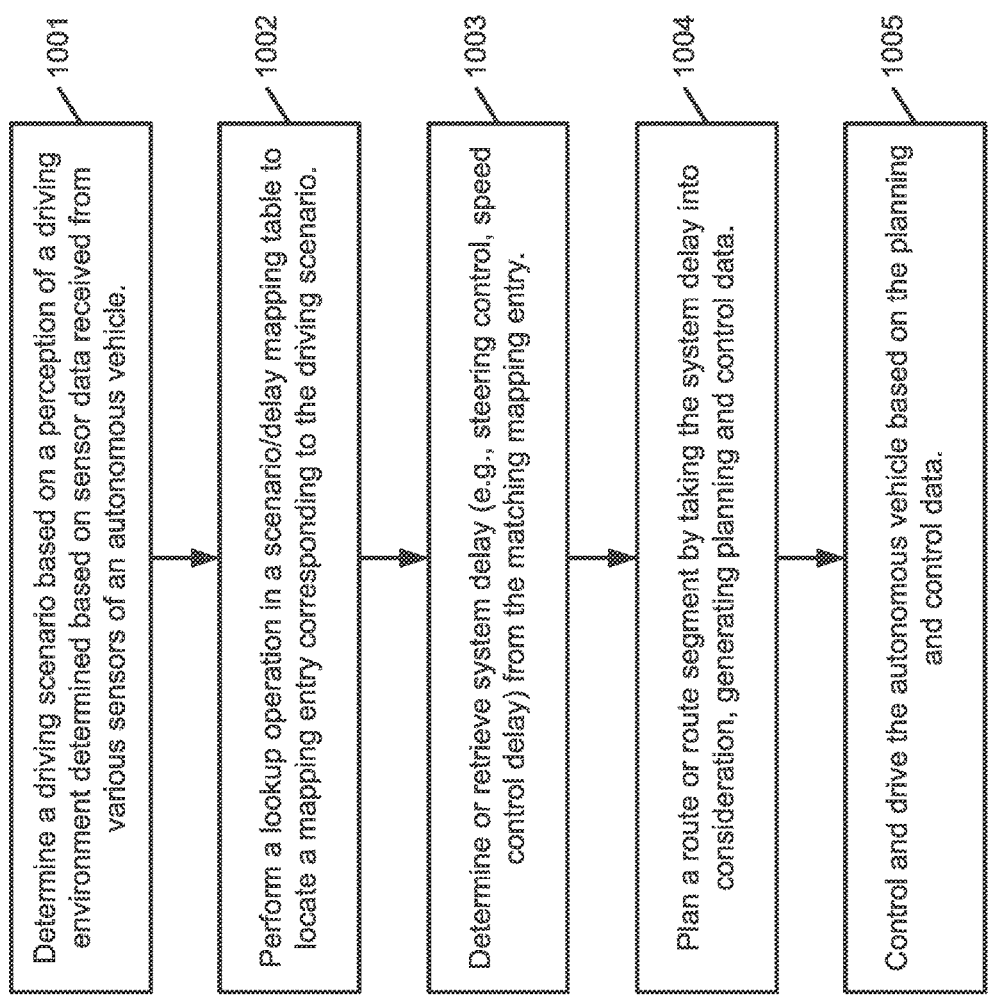
FIG. 10 is a flow diagram illustrating a process of operating an autonomous vehicle with compensation of a system delay according to one embodiment of the invention.

FIG. 10 is a flow diagram illustrating a process of operating an autonomous vehicle according to one embodiment of the invention. Process 1000 may be performed by processing logic which may include software, hardware, or a combination thereof. For example, process 1000 may be performed by data processing system 110 of FIG. 1. Referring to FIG. 10, at block 1001, processing logic determines a driving scenario based on a perception of a driving environment that is determined based on sensor data of various sensors mounted on an autonomous vehicle. At block 1002, processing logic performs a lookup operation in a scenario/delay mapping table to locate a mapping entry corresponding to the driving scenario. The scenario/delay mapping table includes a number of mapping entries. Each mapping entry maps a particular driving scenario to a set of one or more delays that were measured using a variety of vehicles under the same or similar driving circumstances. At block 1003, processing logic retrieves and determines the system delay from the mapping entry. The system delay may be determined based on at least one of a steering control delay, a speed control delay, a computational delay, and a communication delay as described above. At block 1004, processing logic plans a route or route segment by taking the system delay into consideration, generating planning and control data. At block 1005, processing logic drives and controls the autonomous vehicle along the route or route segment based on the planning and control data.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 11:
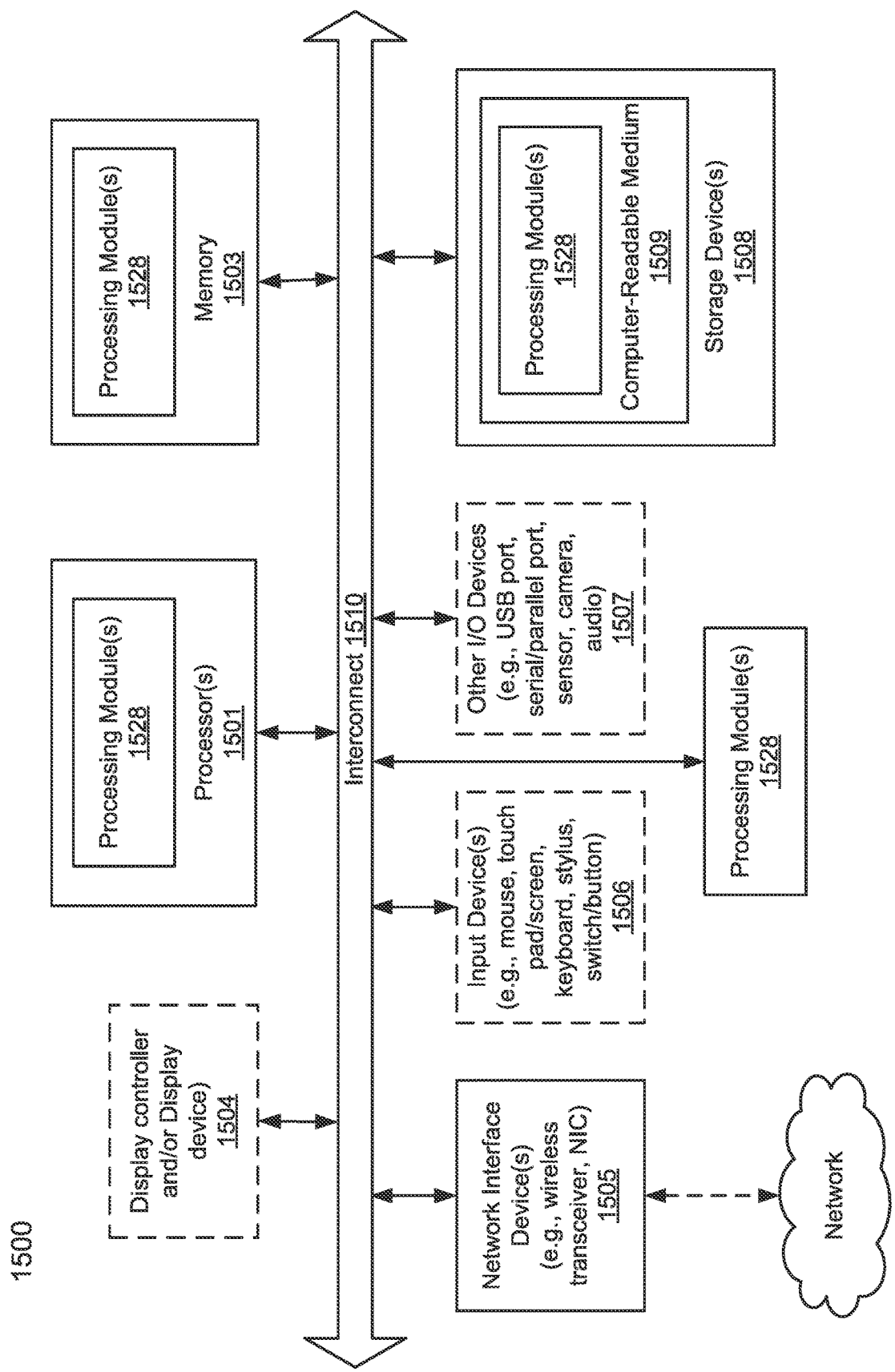
FIG. 11 is a block diagram illustrating a data processing system according to one embodiment.

FIG. 11 is a block diagram illustrating an example of a data processing system which may be used with one embodiment of the invention. For example, system 1500 may represent any of data processing systems described above performing any of the processes or methods described above, such as, for example, data processing system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 301, control module 302, system delay determination module 304, data collector 151, or analysis module 152. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating an autonomous vehicle, the method comprising:
receiving a steering control delay measured between time of issuing a steering control command and time of a first response from one or more wheels of an autonomous vehicle;
receiving a speed control delay measured between time of issuing a speed control command and time of a second response from the one or more wheels of the autonomous vehicle;
receiving an overall system delay estimated based on the steering control delay and the speed control delay using a predetermined algorithm;
perceiving a driving environment surrounding the autonomous vehicle based on sensor data obtained from a plurality of sensors mounted on the autonomous vehicle at a given point in time;
planning a route to drive the autonomous vehicle along the route based on perception data of the driving environment;
generating planning and control data for the route, including specifying a plurality of control commands to be issued at different points in time along the route in view of the overall system delay; and
controlling the autonomous vehicle based on the planning and control data.

2. The method of claim 1, wherein the steering control delay is measured based on time between issuing the steering control command and positioning the one or more wheels in an angle specified by the steering control command.

3. The method of claim 1, wherein the speed control delay comprises an acceleration delay representing a difference between time of issuing an acceleration command and time the autonomous vehicle starts accelerating.

4. The method of claim 1, wherein the speed control delay comprises a deceleration delay representing a difference between time of issuing a braking command and time the autonomous vehicle starts decelerating.

5. The method of claim 1, wherein the predetermined algorithm is a weighted algorithm, and wherein each of the steering control delay and the speed control delay is assigned with a specific weight coefficient for a specific driving scenario.

6. The method of claim 5, wherein when the autonomous vehicle is to turn, a weight coefficient for the steering control delay is adjusted higher.

7. The method of claim 5, wherein when a difference between a current speed and a target speed of the autonomous vehicle becomes larger, a weight coefficient for the speed control delay is adjusted higher.

8. The method of claim 1, further comprising:
receiving a computational delay representing time a control system of the autonomous vehicle takes to generate and issue a control command; and
receiving a communication delay representing a time delay of transmitting a control command over a communication bus of the autonomous vehicle, wherein the system delay is estimated further based on the computational delay and the communication delay.

9. A non-transitory machine-readable medium having instructions stored therein, which when executed by a processor, cause the processor to perform operations of determining a system delay of an autonomous vehicle, the operations comprising:
receiving a steering control delay measured between time of issuing a steering control command and time of a first response from the one or more wheels of an autonomous vehicle;
receiving a speed control delay measured between time of issuing a speed control command and time of a second response from the one or more wheels of the autonomous vehicle;
receiving an overall system delay estimated based on the steering control delay and the speed control delay using a predetermined algorithm;
perceiving a driving environment surrounding the autonomous vehicle based on sensor data obtained from a plurality of sensors mounted on the autonomous vehicle at a given point in time;
planning a route to drive the autonomous vehicle along the route based on perception data of the driving environment;
generating planning and control data for the route, including specifying a plurality of control commands to be issued at different points in time along the route in view of the overall system delay; and
controlling the autonomous vehicle based on the planning and control data.

10. The machine-readable medium of claim 9, wherein the steering control delay is measured based on time between issuing the steering control command and positioning the one or more wheels in an angle specified by the steering control command.

11. The machine-readable medium of claim 9, wherein the speed control delay comprises an acceleration delay representing a difference between time of issuing an acceleration command and time the autonomous vehicle starts accelerating.

12. The machine-readable medium of claim 9, wherein the speed control delay comprises a deceleration delay representing a difference between time of issuing a braking command and time the autonomous vehicle starts decelerating.

13. The machine-readable medium of claim 9, wherein the predetermined algorithm is a weighted algorithm, and wherein each of the steering control delay and the speed control delay is assigned with a specific weight coefficient for a specific driving scenario.

14. The machine-readable medium of claim 13, wherein when the autonomous vehicle is to turn, a weight coefficient for the steering control delay is adjusted higher.

15. The machine-readable medium of claim 13, wherein when a difference between a current speed and a target speed of the autonomous vehicle becomes larger, a weight coefficient for the speed control delay is adjusted higher.

16. The machine-readable medium of claim 9, wherein the operations further comprise:

receiving a computational delay representing time a control system of the autonomous vehicle takes to generate and issue a control command; and receiving a communication delay representing a time delay of transmitting a control command over a communication bus of the autonomous vehicle, wherein the system delay is estimated further based on the computational delay and the communication delay.

17. A data processing system, comprising:

a processor; and a memory coupled to the processor to store instructions, which when executed by the processor, cause the processor to perform operations of determining a system delay of an autonomous vehicle, the operations including receiving a steering control delay measured between time of issuing a steering control command and time of a first response from one or more wheels of an autonomous vehicle, receiving a speed control delay measured between time of issuing a speed control command and time of a second response from the one or more wheels of the autonomous vehicle, receiving an overall system delay estimated based on the steering control delay and the speed control delay using a predetermined algorithm, perceiving a driving environment surrounding the autonomous vehicle based on sensor data obtained from a plurality of sensors mounted on the autonomous vehicle at a given point in time, planning a route to drive the autonomous vehicle along the route based on perception data of the driving environment, generating planning and control data for the route, including specifying a plurality of control commands to be issued at different points in time along the route in view of the overall system delay, and controlling the autonomous vehicle based on the planning and control data.

18. The system of claim 17, wherein the steering control delay is measured based on time between issuing the steering control command and positioning the one or more wheels in an angle specified by the steering control command.

19. The system of claim 17, wherein the speed control delay comprises an acceleration delay representing a difference between time of issuing an acceleration command and time the autonomous vehicle starts accelerating.

20. The system of claim 17, wherein the speed control delay comprises a deceleration delay representing a difference between time of issuing a braking command and time the autonomous vehicle starts decelerating.

21. The system of claim 17, wherein the predetermined algorithm is a weighted algorithm, and wherein each of the steering control delay and the speed control delay is assigned with a specific weight coefficient for a specific driving scenario.

22. The system of claim 21, wherein when the autonomous vehicle is to turn, a weight coefficient for the steering control delay is adjusted higher.

23. The system of claim 21, wherein when a difference between a current speed and a target speed of the autonomous vehicle becomes larger, a weight coefficient for the speed control delay is adjusted higher.

24. The system of claim 17, wherein the operations further comprise:

receiving a computational delay representing time a control system of the autonomous vehicle takes to generate and issue a control command; and receiving a communication delay representing a time delay of transmitting a control command over a communication bus of the autonomous vehicle, wherein the system delay is estimated further based on the computational delay and the communication delay.

* * * * *